April 8, 1958     H. A. TOULMIN, JR     2,829,905
HYDRAULIC SUSPENSION FOR RUNNING GEAR
Filed June 1, 1955     4 Sheets-Sheet 1
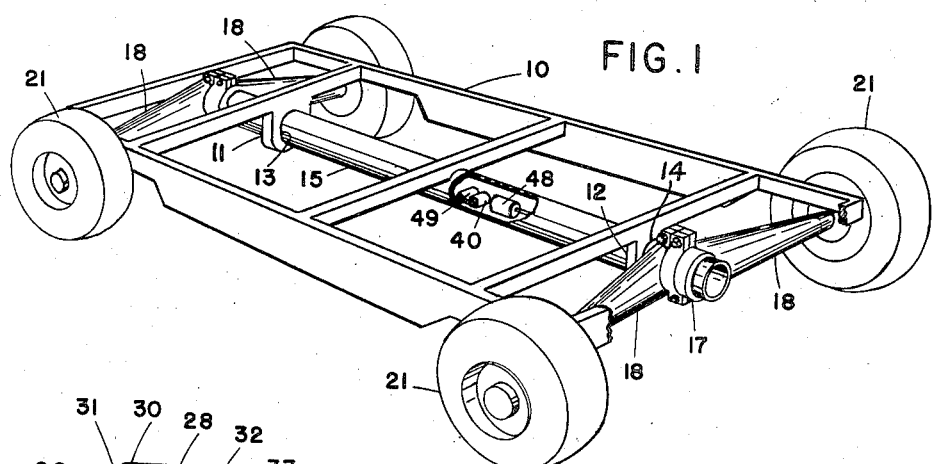
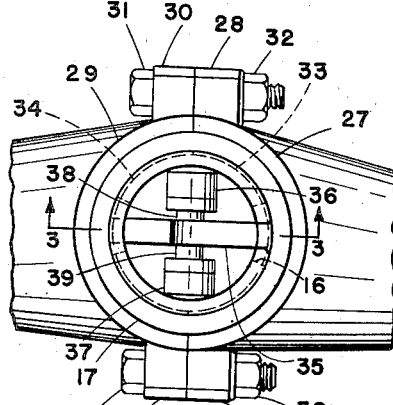
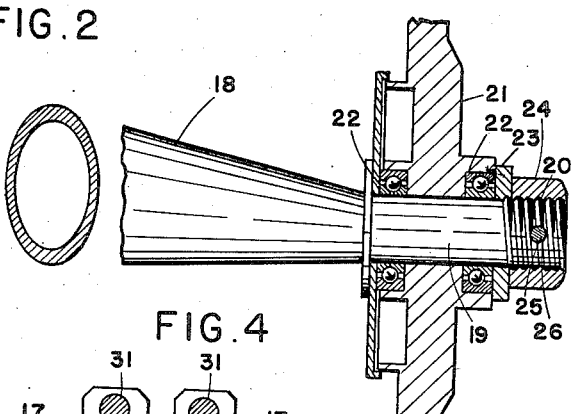
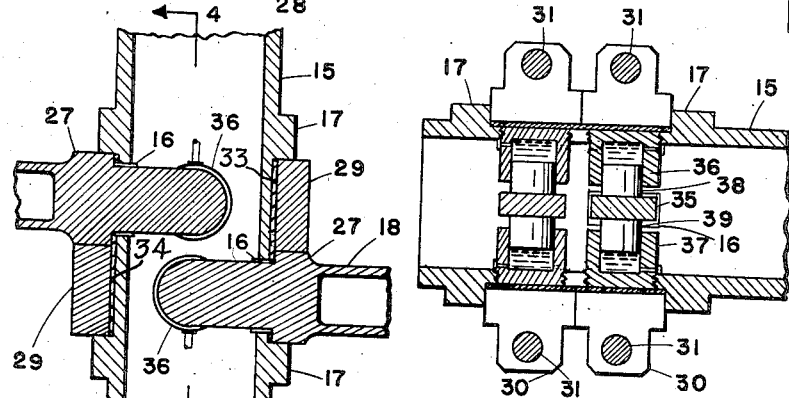
FIG.3
INVENTOR
HARRY A. TOULMIN, JR.
BY Toulmin & Toulmin
ATTORNEYS April 8, 1958     H. A. TOULMIN, JR     2,829,905
HYDRAULIC SUSPENSION FOR RUNNING GEAR
Filed June 1, 1955     4 Sheets-Sheet 2

INVENTOR
HARRY A. TOULMIN, JR.
BY *Toulmin & Toulmin*
ATTORNEYS

April 8, 1958     H. A. TOULMIN, JR     2,829,905
HYDRAULIC SUSPENSION FOR RUNNING GEAR
Filed June 1, 1955     4 Sheets-Sheet 3
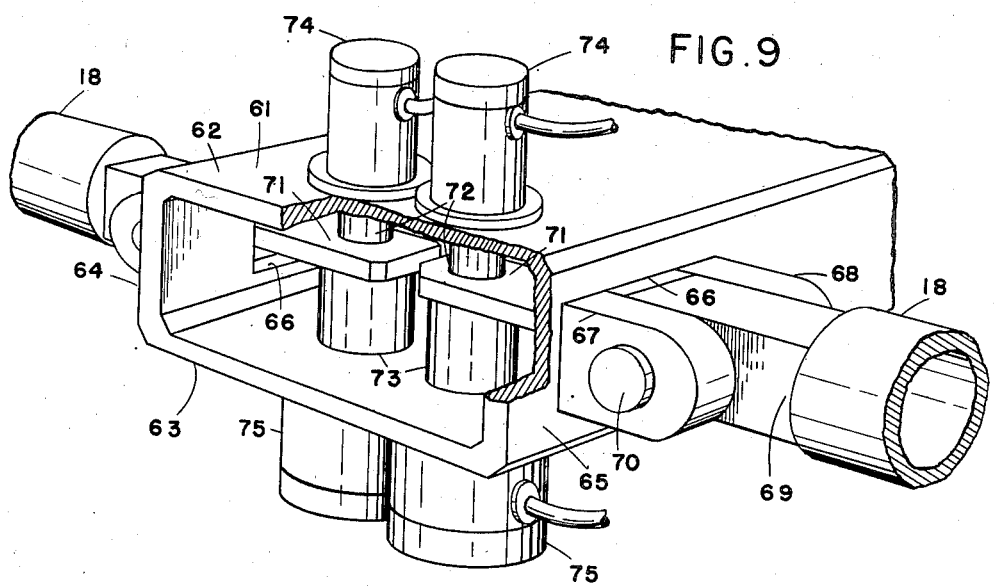
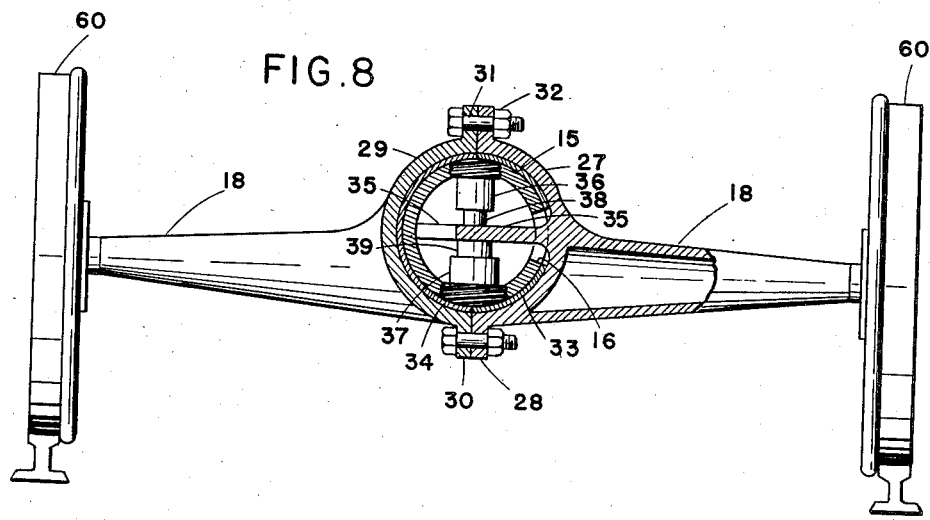
INVENTOR
HARRY A. TOULMIN, JR.
BY *Toulmin & Toulmin*
ATTORNEYS

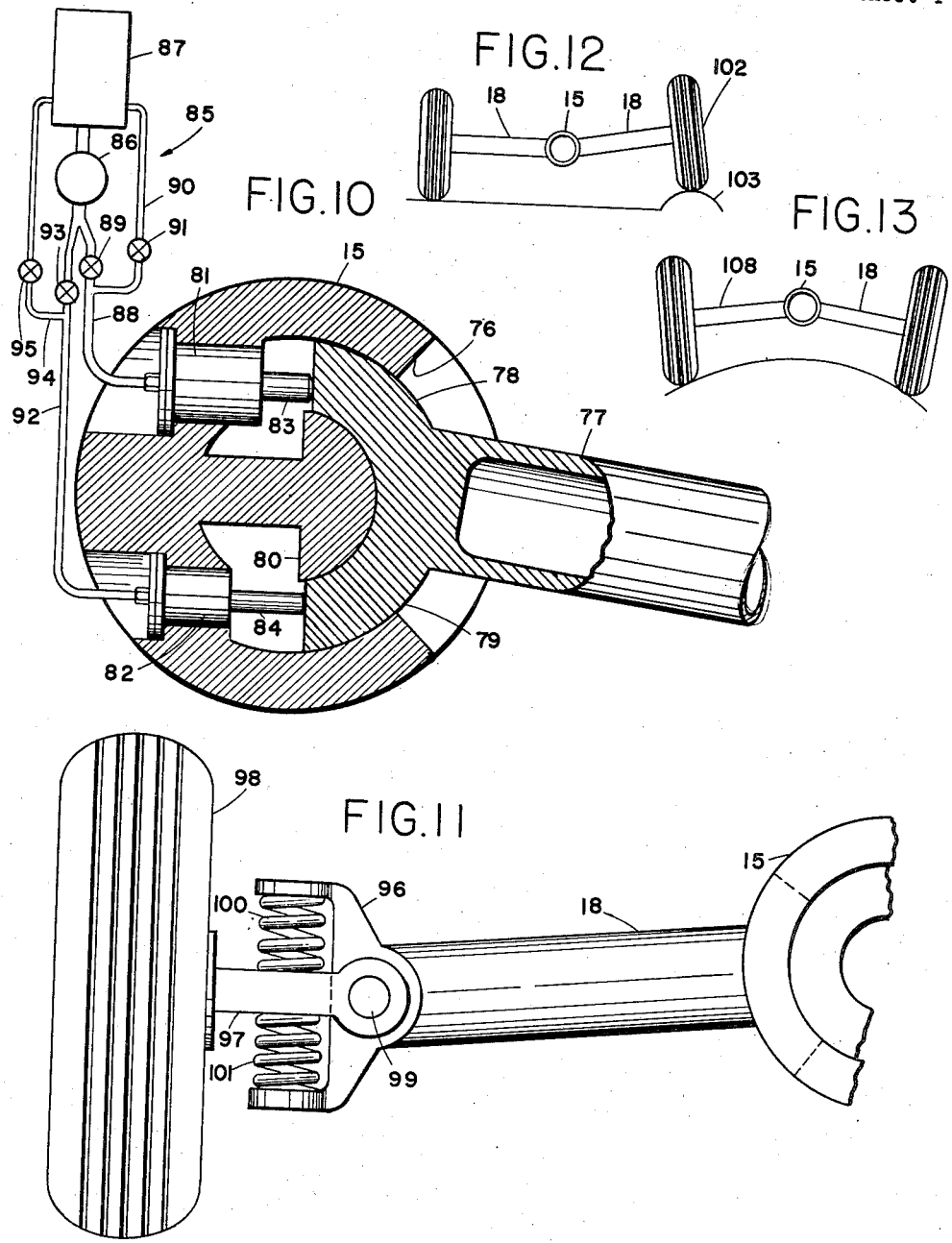

United States Patent Office 2,829,905
Patented Apr. 8, 1958

2,829,905

HYDRAULIC SUSPENSION FOR RUNNING GEAR

Harry A. Toulmin, Jr., Dayton, Ohio, assignor to The Commonwealth Engineering Company of Ohio, Dayton, Ohio, a corporation of Ohio Application June 1, 1955, Serial No. 512,367

17 Claims. (Cl. 280—106.5)

The present invention relates to running gear for a vehicle, more particularly to a hydraulic suspension system adapted for either rail or road vehicles.

The conventional suspension system for a vehicle essentially comprises an arrangement of springs which interconnects the axles of the vehicle with the frame thereof. The wheels on a side of the vehicle are resiliently connected to that side of the vehicle. Shock absorbers are usually provided in conjunction with the springs in order to damp vibrations. With this spring suspension system vibrations are subsequently transmitted to both sides of the vehicle as the individual wheels encounter shock producing road conditions.

In the past some use has been made of transverse leaf springs. The central portion of the spring is suitably connected to the vehicle at the longitudinal axis thereof with the wheels supported on each end of the spring. However, in most cases shock absorbers are also employed to connect the ends of the transverse spring to the frame of the vehicle in order to damp vibrations set up in the spring. The use of the transverse spring without any shock absorbers is generally not satisfactory since the vibrations set up in the springs continue until they damp naturally. This, however, seldom occurred, since new vibrations were constantly being transmitted from the wheels to the springs. Consequently, the use of the transverse leaf springs offered little, if any, advantages over other types of spring suspension systems.

In view of the above, it would appear that the ideal suspension system would both absorb and damp vibrations. In addition, this suspension system would transmit the shocks to a central point where they are absorbed and damped rather than absorbing and damping the shock at the sides of the vehicle which produces rolling and swaying of the vehicle.

The present invention discloses a suspension system wherein the wheel axles are pivoted about a member aligned with the longitudinal central axis of the vehicle. Hydraulic means are provided to act on the axles at their pivot point. These hydraulic means have sufficient resilient characteristics to absorb vibrations transmitted to the axle and simultaneously serve to damp these vibrations. Means are also provided for supplying hydraulic fluid under pressure to the aforementioned hydraulic means. With this arrangement all vibrations are transmitted to the area of the longitudinal axis of the vehicle where they are subsequently absorbed and damped. Any vibrations which are not completely absorbed by the hydraulic means are transmitted to the central axis of the vehicle. The magnitude of these vibrations, however, will be so small that the riding qualities of the vehicle are virtually unaffected. In addition, since the vibrations are transmitted to the longitudinal axis of the vehicle and not along the sides of the vehicle, it can be seen that the rolling action of the vehicle is considerably reduced.

In addition, this suspension system acts to stabilize a vehicle equipped therewith. The hydraulic system enables the vehicle frame to be maintained in a level position regardless of the location of the axles due to an uneven terrain.

A modification of the invention discloses wheels spring mounted on an axle which in turn is pivotally mounted and positionable by hydraulic means. Use of this modification results in a smoother riding vehicle.

This suspension system may also be satisfactorily applied to railway cars. The conventional railway truck has the wheels fixed in respect to each other. Consequently, when the railway car is proceeding around a curve it is necessary for the wheels to skid along the rails in a constant change of direction. This skidding action is a particularly objectionable feature in passenger cars as noises are produced which are annoying to the passengers. In addition, the skidding causes swaying of the car which results in an uncomfortable ride to the passengers. Noises originating from the skidding are especially objectionable to occupants of sleeper cars.

Since the wheels skid along the rails it may readily be seen that this sliding action causes undue wear on the wheels, the rails, and the bearing connecting the truck to the underside of the car frame.

A railway car truck equipped with the suspension system of this invention absorbs and damps vibrations in the same manner as described in connection with a vehicle. The absorbing and damping of all vibrations along the longitudinal axis of the railway car also results in a much more comfortable ride.

It is, therefore, the principal object of this invention to provide an improved vehicle running gear.

It is another object of this invention to provide running gear which functions as both a wheel suspension system and a shock absorber.

It is a further object of this invention to provide a hydraulic wheel suspension system.

It is an additional object of this invention to provide a running gear which is adapted to be employed with either motor vehicles or railway cars.

It is still another object of this invention to provide a hydraulic wheel suspension system which has incorporated therein an improved shock absorbing structure.

It is still another object of this invention to provide a method of reducing the magnitude of road shocks transmitted through the wheels of a vehicle to the body thereof.

It is still a further object of this invention to provide a running gear which stabilizes the vehicle regardless of the position of the wheels.

Other objects and advantages of this invention will become apparent upon reference to the following description when taken in conjunction with the accompanying drawings wherein—

Figure 1 is a perspective view of the running gear disclosed as this invention, attached to the frame of a vehicle;

Figure 2 is a front elevational view of the running gear showing the manner in which the axle is attached to the tubular support member and the arrangement of the hydraulic pistons within the axle;

Figure 3 is a section view taken along the line 3—3 of Figure 2;

Figure 4 is a sectional view taken along the line 4—4 of Figure 3;

Figure 8 is a front elevational view of the railway truck illustrated in Figure 7 with a vertical transverse section through the support member;

Figure 9 is a perspective view showing a modification in attaching the axle to the tubular support member;

Figure 10 is a vertical transverse sectional view through the support member showing a modification of the manner of pivotally mounting an axle on the support member;

Figure 11 is a front elevational view of a modification wherein the wheel is resiliently mounted on the axle; and Figures 12 and 13 are schematic views illustrating the stabilizing feature when the wheels are in various positions.

Figure 7:
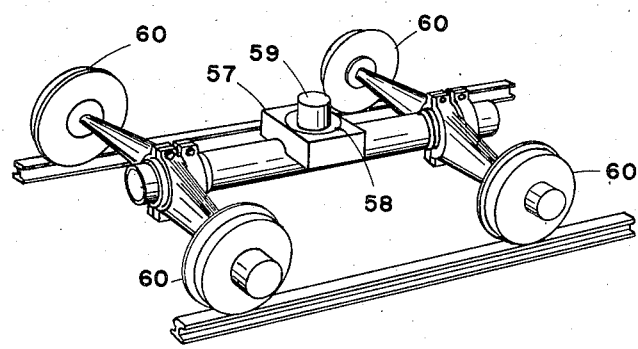
Figure 7 is a perspective view of the running gear of this invention as applied to a railway truck.

Referring to the drawings, and more particularly to Figure 1 wherein like reference symbols indicate the same parts throughout the various views, 10 indicates the frame of a vehicle. This frame is to be represenative of vehicle frames in general and is not intended to establish any limitation on the frames to which the running gear of this invention may be attached. Frame 10 has depending brackets 11 and 12 which are mounted along the longitudinal axis of the frame. Each bracket has centrally located apertures 13 and 14 respectively therein.

A cylindrical tubular support member 15 is received within the apertures 13 and 14 of the brackets. The support member 15 is rigidly affixed to the brackets 11 and 12 in any suitable manner such as welding. A cylindrical support member is employed since a cylinder has the greatest strength in respect to the amount of material therein. The thickness of the wall of the pivoted support member is sufficient to result in a substantially rigid support member. There is a pair of openings 16 in the tubular support member adjacent each end thereof. The openings 16 adjacent each end of the tubular support member are on opposite sides thereof and are staggered longitudinally with respect to each other. The reason for this arrangement will be readily apparent when the manner in which the axles are secured to the tubular support member is discussed. There are raised portions 17 on the support member at both ends of each pair of openings 16. The raised portions serve as collars to retain the axles in position upon the support member.

A pair of wheels are mounted on the tubular support member adjacent each end thereof laterally spaced from the openings 16. Each wheel is mounted upon an axle 18 the central portion of which is hollow and has an elliptical cross-section. The axle may be formed of steel or a suitable aluminum alloy. There is a spindle 19 on the outer end of the axle. External threads 20 are provided on the outer end of the spindle. A wheel 21 is journalled upon the spindle. The wheel 21 has suitable bearings, as indicated at 22, and is retained upon the spindle by means of a washer 23, and a cap 24 which is threaded upon the threads 19 and secured in place by a cotter pin or the like 25 inserted through a passage 26 in the threaded portion of the spindle.

The inner end of the axle is constructed to pivot about the tubular support member. This structure is substantially similar to the crank end of a conventional automobile connecting rod. This structure comprises a semi-circular inner portion 27 having a radius of curvature slightly greater than the outer radius of the tubular support member. There are flanges 28 extending radially outward from the curved portion 27. A cap 29 having flanges 30 is secured to the inner curved portion 27 by means of bolts 31 which pass through aligned apertures in the flanges 28 and 30 and are secured in position by nuts 32. There is an inner bearing 33 received within the inner curved portion 27 and an outer bearing 34 received within the cap 29. The bearings 33 and 34 have a radius of curvature which is substantially equal to that of the outer surface of the tubular support member and consequently the axle 18 is enabled to pivot thereabout between a collar 17 and the connecting structure of the other axle.

There is an extension arm 35 extending radially inwardly from the inner curved portion 27. The arm 35 extends through the respective opening 16 in the tubular support member. The arm 35 is integral with the axle structure and is of especially strong construction so as to be rigid therewith. The arm 35 extends slightly beyond the vertical center line of the tubular support member when the axle is in position on the support member.

As will become apparent from an examination of Figure 1, the axle 18 normally extends laterally outwardly from the tubular support member. To maintain the axles in this lateral position a hydraulic system is provided with components thereof mounted within the tubular support member. The portions mounted within the tubular support member comprise an upper hydraulic cylinder 36 and a lower hydraulic cylinder 37, both of which are so positioned within the tubular support member that their longitudinal axes coincide with the vertical transverse axis of the tubular support member. Each of the hydraulic cylinders comprises hydraulic pistons 38 and 39 respectively extending therefrom. The outer ends of the hydraulic pistons 38 and 39 engage the extension arm 35 in the manner as illustrated in detail in Figure 2. Consequently, movement of the extension arm 35 due to pivoting action of the axle about the tubular support member will result in simultaneous movement of both hydraulic pistons 38 and 39 into the respective hydraulic cylinders.

There is a hydraulic pump 40 to supply hydraulic fluid under pressure to the hydraulic cylinders. The hydraulic pump 40, together with an operating motor as shown in Figure 1, is located in the tubular support member 15. The fluid is pumped through a one-way valve 41 to a main hydraulic line 42, to which are connected the upper branch line 43 and the lower branch line 44. The upper branch 43 leads to the upper cylinders 36 and the lower branch line leads to the lower cylinders 37. There is a bypass line 45 having a bypass valve 46 which serves to conduct the hydraulic fluid around the hydraulic cylinders and into the pump inlet line 47 which leads from a reservoir 48 also mounted in the tubular support member. The reservoir may also be formed by partitioning off a section of the tubular support member. The entire hydraulic system, including the lines and valves, is mounted within the tubular support member.

One-way valve 41 and bypass valve 46 are adjusted so as to pass the hydraulic fluid only under considerable pressure as set up when the hydraulic pump is operating. Consequently, when the pump is inoperative the fluid in the hydraulic cylinders will not drain through either the one-way valve or the bypass valve.

The hydraulic pump is drivingly connected to a suitable source of power, such as an electric motor 49, by means of a drive belt 50. When independent power such as an electric motor is used the speed of the motor is controlled by a governor 51 which regulates the speed of the electric motor in direct proportion to the speed of the vehicle. In some installations it may be desirable to power the hydraulic pump by connecting the drive belt to a wheel of the vehicle.

Figure 6:
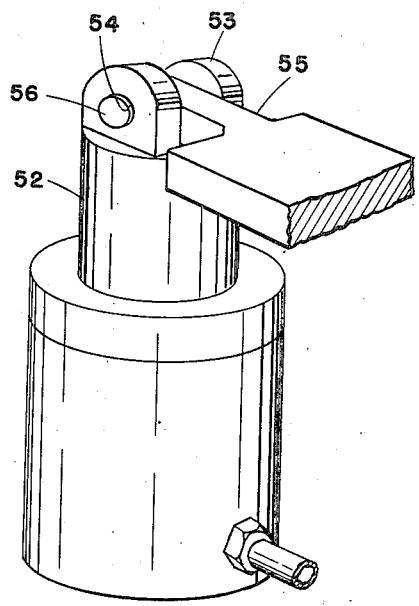
Figure 6 is a perspective view of the pivot connection which may be employed between the hydraulic piston and the extension arm of the axle.
Figure 5:
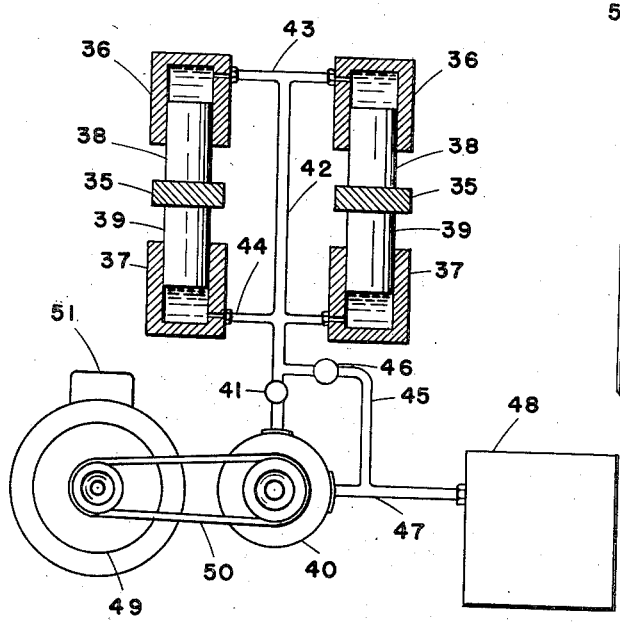
Figure 5 is a diagrammatic view of the hydraulic system for applying hydraulic fluid under pressure to the hydraulic pistons.

In Figure 6 is illustrated a pivot connection of a hydraulic piston and an extension arm of the axle. In this modification a hydraulic piston 52 has a bifurcated bracket 53 at the end thereof. There are aligned openings 54 through both portions of the bifurcated bracket. The extension arm of the axle has a tongue 55 projecting therefrom which is pivotally connected between the portions of the bracket 53 by means of a pivot pin 56. With this connection there is no necessity for employing opposed hydraulic cylinders with each extension. It is only necessary to employ a single hydraulic cylinder because the direct connection between the extension arm of the axle and the hydraulic piston will result in movement in either direction of the hydraulic piston in response to pivotal movement of the axle.

Proceeding now to Figure 7 there is illustrated therein a railway car truck employing the suspension system disclosed in this invention. This structure is essentially the same as the suspension system illustrated in Figure 1, except that no frame is necessary. In place of the frame, a block 57 is centrally located on the tubular support member. This block carries a thrust bearing 58 and a pivot 59 which connects the truck with the underside of the car frame. In addition, railway wheels 60 are secured to the spindles of the axles. Except for these modifications in structure, this structure is similar to the suspension system employed by a vehicle, as illustrated in Figure 1.

In Figure 9 there is illustrated a modified structure for pivotally attaching the axles to a support member. In this modification a tubular support member 61 has a substantially rectangular cross section with a top 62, a bottom 63, and sides 64 and 65 respectively. There are opposed openings 66 in the sides 64 and 65. A pair of brackets 67 and 68 extend outwardly from the side of the tubular support member and are longitudinally spaced, being positioned at each end of the respective side opening. The axle 18 is modified to comprise a rectangular portion 69 which is closely received between the brackets 67 and 68 and is pivoted therebetween by means of a pin 70. There is an extension arm 71 projecting from the rectangular portion 69 through the opening 66 into the tubular support member. The extension arm 71 is acted upon by upper and lower hydraulic pistons 72 and 73 respectively which are housed in hydraulic cylinders 74 and 75 respectively attached to the tubular support member. In a manner similar to that described in connection with Figure 1, a hydraulic system is provided to supply the hydraulic cylinders with hydraulic fluid under pressure.

Proceeding now to Figure 10 there is illustrated therein a vertical transverse sectional view of a modification of structure for pivotally mounting an axle to the support member and for maintaining the axle in normal extended position. The support member 15 has a circumferentially extending slot 76 in the wall thereof. Extending through this slot is an axle 77 having integral with the inner end thereof upper and lower arcuate arms 78 and 79 respectively. The outer surfaces of the arcuate arms 78 and 79 slidingly engage the inner surface of the tubular support 15. Inner bearing means 80 are fixed in the central portion of the tubular support member to maintain the arcuate arms of the axle in engagement with the inner surface of the tubular support member.

Positioned in the wall of the tubular support member opposite the arcuate slot is a pair of hydraulic cylinders 81 and 82. Each of the cylinders has pistons 83 and 84 extending therefrom to engage the ends of the upper and lower arcuate arms of the axle. Since the weight of the vehicle tends to rotate the axle in a counter clockwise direction, as viewed in Figure 10, the upper hydraulic cylinder 81 is larger than the lower hydraulic cylinder in order to exert a greater force upon the axle and to more evenly distribute the work between the two hydraulic cylinders.

A hydraulic system indicated generally at 85 is employed to operate the hydraulic cylinders. The system essentially comprises a pump 86 which pumps hydraulic fluid from a reservoir 87 through a high pressure line 88 to the upper hydraulic piston 81. A check valve 89 is connected in the high pressure line 88 to regulate the hydraulic pressure supply to the hydraulic cylinder 81. There is a by-pass line 90 having a relief valve 91 therein which connects to the high pressure line between the valve 89 and the hydraulic cylinder 81. This by-pass line 90 leads to the reservoir 87.

Similarly, there is a low pressure line 92 leading from the pump 86 to the lower hydraulic cylinder 82. There is a check valve 93 located in the low pressure line which also serves to supply hydraulic fluid at a proper pressure to the lower hydraulic cylinder. A by-pass line 94 having a relief valve 95 therein connects the low pressure line with the reservoir.

In this modification hydraulic fluid is supplied at the proper pressures to both the hydraulic cylinders 81 and 82 to maintain the axle in normal extended position. Should the wheel mounted upon the end of the axle hit a bump so as to cause pivotal movement of the axle and movement of the piston 83 into hydraulic cylinder 81, the increased pressure in the high pressure line 88 will be lowered by by-passing the hydraulic fluid through the by-pass line to the reservoir. The axle will remain at its abnormal position until the wheel passes over the bump. When this occurs the axle will return to its normal position and the hydraulic pressures in both of the hydraulic cylinders will maintain the axle in its normal extended position.

In Figure 11 there is disclosed a modification wherein the wheel is resiliently mounted upon the end of the axle. The axle 18 may be pivoted from the tubular support member either as shown in Figure 2 or Figure 10. A bracket 96 is secured to the end of the axle. A spindle 97 upon the end of which is rotatably mounted a wheel 98 is pivoted at the point 99 on the end of the axle. A pair of helical springs 100 and 101 disposed above and below the pivoted spindle 97 urge the spindle into its normal position, as illustrated in Figure 11.

With this mounting of the wheel, small bumps and road shocks are readily absorbed by the springs. The effects of any larger depressions and bumps which the wheel may encounter are eliminated by the hydraulic system which maintains the axle extending in its normal position. In this modification, the springs serve to eliminate vibrations and the like and the hydraulic means stabilizes the vehicle regardless of the instant position of the wheel. Therefore, the overall effect of the springs and the hydraulic system results in a smooth riding running gear which also serves to maintain the frame of the vehicle in a level position.

With the above description of the running gear of this invention in mind, the operation of this running gear will next be considered. As a background against which the operation of the running gear may be described, several comments pertaining to the nature of vibrations are in order.

Vibrations comprise both frequency and amplitude. The frequency of the vibrations of the vehicle suspension system is determined by the natural frequency of the vehicle as a whole. Natural frequency of the vehicle is in turn produced by the natural frequency of each of the main components thereof. Hence, the natural frequency of the vehicle is substantially constant once the vehicle has been assembled.

The amplitude of vehicle vibrations is determined by the speed of the vehicle and by various road conditions. The amplitude varies directly as the speed of the vehicle. Hence, an increase in speed will result in a higher vibration.

In order to provide a vehicle running gear which will compensate for the amplitude of vibrations, as the speed of the vehicle varies, a governor is provided to vary the speed of the hydraulic pump in direct relationship to the speed of the vehicle. Consequently, the vehicle running gear has increased shock absorbing and damping properties at higher speeds when these increased properties are desirable. Therefore, increases in speed will not result in increased amplitude of vibrations in vehicles having the suspension system disclosed as this invention.

It is pointed out that both railway cars and motor vehicles may be provided with the governor in order to function in a similar manner. The governor may be omitted from the running gear but as pointed out previously, improved damping characteristics will result from use of the governor.

With the vehicle under motion the hydraulic system will supply fluid under pressure to both upper and lower hydraulic cylinders. Consequently, the axles will be maintained in the normal laterally extending position. Should the wheel of the vehicle encounter a depression in the road, this action will cause the axle to pivot about the tubular support member which pivotal movement will cause both the upper and lower hydraulic pistons to move inwardly within their respective hydraulic cylinders. The resilient characteristics of the hydraulic system as a whole will result in the hydraulic systems being returned to the normal position when the depression is passed. The force exerted against the hydraulic pistons by the fluid will be transmitted to the extension arm and will result in the axle being returned to its normal position.

Reference to Figures 12 and 13 will illustrate the manner in which the running gear of this invention maintains the vehicle in a level position regardless of the positioning of the wheels. The schematic illustration of Figure 12 discloses the right wheel of the running gear indicated at 102 passing over a bump 103. The action of the pump 103 against the right wheel 102 will pivot the axle in a counter-clockwise direction as shown. However, there will be no movement of the tubular support member. The running gear will remain in the position illustrated in Figure 12 until the right wheel has passed the bump and returns to normal position. During this time that the wheel is riding over the bump, the frame of the vehicle is maintained in a level position. This example illustrates the stabilizing feature of this running gear.

Figure 13 shows one or both of the wheels encountering a depression such as illustrated therein. Again, the tubular support member will remain in its original position. However, each one of the axles with the wheel thereon will pivot downwardly in a manner illustrated. When the vehicle returns to level ground, the hydraulic system located within the tubular support member will return to the axles with their normal extended positions.

Thus it can be seen that the vehicle running gear as described above provides a hydraulic suspension system which both absorbs and damps vibrations transmitted through the wheels to the tubular support member and stabilizes the vehicle. In addition, this vehicle running gear is simple in construction and operation. All of the operating components of the hydraulic system are housed in the tubular support member. Since this running gear is completely hydraulic in operation and since all road shocks are conducted to the longitudinal central axis of the vehicle where they are absorbed, it is apparent that the disclosed running gear represents a considerable improvement in this field.

It will be understood that other modifications and arrangements in structure could be made without departing from the spirit of this invention, and accordingly it is desired to comprehend such modifications and substitutions of equivalents as may be considered to come within the scope of the appended claims.

What is claimed is:

1. In vehicle running gear, a tubular support member extending along the longitudinal axis of the vehicle, an axle having a wheel on the outer end thereof pivotally mounted on support member, and liquid pressure means mounted in said support member bearing against the inner end of said axle to resiliently maintain said axle laterally extending from said support member.

2. In vehicle running gear, a tubular support member extending longitudinally along the frame of the vehicle, laterally extending axle means having wheels on the outer ends thereof pivotally mounted on said support member, said support member having openings cooperating with said axle means, rigid means extending from said axle means through said openings into said support member, and resilient liquid pressure means within said support member acting upon said last-mentioned means to maintain said axle means in position.

3. A vehicle running gear comprising a tubular support member extending longitudinally along the frame of the vehicle, a pair of laterally projecting axles having wheels on the outer ends thereof mounted on said tubular member for pivotal movement thereon and extending in opposite directions, said axles being adjacent each other about said support member, and hydraulic means in said tubular support member acting on the inner ends of said axles to resist the pivotal movement of said axles independently.

4. Vehicle running gear comprising a longitudinally extending tubular support member, a pair of laterally projecting axles extending in opposite directions from said support member, clamp means on the inner ends of each axle for pivotally securing the end of the axle to said support member, means on said support member maintaining said axles in position thereon, said support member having openings therein cooperating with said axle, an arm integral with each axle and extending through said openings into said support member, and hydraulically actuated pistons acting upon said arms to maintain said axles in position.

5. Vehicle running gear as claimed in claim 4, with said hydraulic pistons being pivotally connected with said extending arms.

6. Vehicle running gear comprising a tubular support member, a pair of laterally projecting axles mounted on said tubular member for pivotal movement thereon and extending in opposite directions, said axles being retained adjacent each other about said support member, said support member having openings cooperating with said axles, rigid extensions on each axle projecting into said openings, hydraulic pistons within said tubular member positioned above and below said extensions and in engagement therewith, and means for supplying hydraulic fluid under pressure to said pistons.

7. Vehicle running gear as claimed in claim 6, with each pair of opposing hydraulic pistons being aligned with the vertical transverse axis of said tubular member.

8. In combination, a vehicle frame, a tubular support member secured to said frame along the longitudinal axis thereof, axles having wheels on the outer ends thereof independently mounted on said tubular member for pivotal movement thereabout and extending laterally therefrom, hydraulic means within said tubular member acting upon the inner ends of said axles to resiliently maintain said axles in position, and means to supply hydraulic fluid under pressure to said hydraulic means.

9. In combination, a vehicle frame, a tubular support member having openings therein secured to said frame along the longitudinal axis thereof, axles having wheels on the outer ends thereof pivotally mounted on said tubular support, extending laterally therefrom and aligned with said openings, each axle having an integral portion thereof extending into said tubular member through said opening, hydraulic means bearing against said extending portions to resiliently maintain said axles in position, and means to supply hydraulic fluid under pressure to said hydraulic means.

10. The combination as claimed in claim 9, with said hydraulic means having a piston extending therefrom and pivotally connected to said axle extension.

11. In a railway car truck, an axially extending longitudinal tubular support member, means for pivotally securing said tubular member to the underside of the railway car, axles having wheels on the outer ends thereof pivotally mounted on said tubular member and laterally extending therefrom, said tubular member having openings therein for cooperating with said axles, integral portions on said axles extending through said openings into said tubular member, and hydraulic means acting upon said extending portions to resiliently maintain said axles in position.

12. Vehicle running gear comprising a longitudinally extending tubular support member, said member having opposed openings in the sides thereof, bracket means on said tubular member adjacent said openings, axles having wheels on the outer ends thereof extending laterally from said tubular member and pivotally mounted on said brackets, portions of said axles projecting through said openings into said tubular member, hydraulic pistons mounted on said tubular member and acting upon said projecting axle portions to maintain said axles in laterally extending position, and means supplying hydraulic fluid under pressure to said hydraulic pistons.

13. In a vehicle running gear, a tubular support member extending along the longitudinal axis of the vehicle, laterally extending axles pivotally mounted on said support member, wheels resiliently mounted on the outer ends of each of said axles, and hydraulic means within said tubular support member acting upon the inner ends of said axles for resisting rotative movement of said axles about said support member.

14. A vehicle running gear comprising a tubular support member extending along the longitudinal axis of the vehicle, axles extending laterally from said support member and pivotally mounted thereon, a bracket upon the end of each of said axles, a spindle for a wheel pivotally mounted on the outer end of each of said axles, helical spring means mounted between said bracket and the upper and lower surfaces of said spindle to resiliently position said spindle in normal position, and hydraulic means within said tubular support member acting upon the inner ends of said axles for resisting the rotative movement of said axles about said tubular support member.

15. A vehicle running gear as claimed in claim 14, and said hydraulic means comprising a reservoir, a pump for pumping hydraulic fluid from said reservoir, a high pressure hydraulic line between said pump and the upper of said hydraulic cylinders, a by-pass from said high pressure hydraulic line to said reservoir, a low pressure hydraulic line from said pump to the lower of said hydraulic cylinders, and a by-pass interconnecting the low pressure line and said reservoir.

16. A vehicle running gear comprising a tubular support member extending longitudinally along the vehicle, there being a plurality of circumferentially extending slots in the walls of said tubular support member, axles having wheels on the outer ends thereof extending laterally from said tubular member and extending through said slots, means on the inner ends of each of said axles for rotatively engaging the inner surface of said tubular support member to pivotally mount said axles on said tubular support member, and hydraulic means acting upon said engaging means for resisting the rotative movement of said axles about said support member.

17. In a vehicle running gear, a tubular support member, axles extending laterally from said tubular member and pivotally mounted thereon, there being openings in the sides of said tubular member, portions of said axles protruding through said openings into said tubular member, hydraulic means acting upon the upper and lower surfaces of each of said axle extensions, branch hydraulic lines extending from each of said hydraulic means, a main hydraulic line interconnecting each one of said branch hydraulic lines, a hydraulic pump to supply hydraulic fluid under pressure to said main hydraulic line, a reservoir for retaining a supply of hydraulic fluid, an inlet conduit connecting said reservoir and the inlet of said hydraulic pump, and a by-pass line interconnecting said main hydraulic line and said inlet conduit.

References Cited in the file of this patent

UNITED STATES PATENTS

| | | |
|---|---|---|
| 2,161,431 | Rabe | June 6, 1939 |
| 2,183,940 | Porsche | Dec. 19, 1939 |
| 2,251,698 | Willson | Aug. 5, 1941 |
| 2,346,123 | Willson | Apr. 4, 1944 |
| 2,525,988 | Willson | Oct. 17, 1950 |

FOREIGN PATENTS

| | | |
|---|---|---|
| 782,921 | France | Mar. 25, 1935 |